Patented Aug. 6, 1940

2,210,117

UNITED STATES PATENT OFFICE 2,210,117

MANUFACTURE OF HYDROCARBON GASES FROM COAL

Henry Dreyfus, London, England

No Drawing. Application June 22, 1937, Serial No. 149,663. In Great Britain July 23, 1936

7 Claims. (Cl. 260—679)

This invention relates to the manufacture of hydrocarbon gases from coal.

Reactive hydrocarbon gases, such for example as acetylene and the lower olefines, e. g. ethylene and propylene, are of considerable value as raw materials in the manufacture of aliphatic and other chemicals. For example ethylene may be employed in the manufacture of ethyl alcohol or diethyl ether by absorption in sulphuric acid and subsequent hydrolysis of the absorption product. Acetylene may be converted into acetaldehyde by hydration in the presence of various catalysts, for example mercury salts, and acetaldehyde is a useful raw material for the production of acetic acid. It is thus apparent that if these reactive hydrocarbons can be produced in high yields by a relatively simple and inexpensive process from coal, this will provide not only a very convenient source of the aliphatic and other chemicals but also a valuable method of utilising coal.

According to the present invention coal is subjected to extraction with an organic solvent or solvent mixture, the extracted fraction of the coal is hydrogenated, and the product is subjected to thermal decomposition.

The extraction may be performed with the aid of a great variety of organic solvents. For example hydrocarbons or other neutral solvents may be employed, e. g. tetrahydronaphthalene or decahydronaphthalene or higher boiling hydrocarbons, for example phenanthrene, hydrogenated anthracenes and phenanthrenes, benzyl-naphthalenes, diphenyl-benzene and tetra-amyl-ene. As well as, or instead of, neutral solvents there may be used phenols, for example relatively high boiling fractions of tar acids or more or less chemically pure phenols, such as p-benzylphenol or 1-[α-hydroxy-benzyl] naphthalene, or basic compounds may be used, for instance pyridine, quinoline, quinaldine, or higher boiling bases, e. g. acridine, benzyl quinolines, hydrogenated acridines and other hydrogenated heterocyclic bases. Advantageously a neutral solvent may be employed in association with a phenol or a basic solvent. For example a hydrogenated naphthalene may be used in association with phenols, the phenols being present for instance in amount between 15 and 35%, or with basic compounds which may be present in similar amounts or in smaller quantities.

The temperature at which the extraction is carried out may be above 200° or 250° C.; for instance temperatures between about 300° and 400° C. are particularly valuable. It is often of advantage to employ higher temperatures in the later stages of the extraction process than in the earlier; for example the extraction may be commenced at a temperature of about 250°–280° C. while in the later stages temperatures of 300° to 330° or 350° C. and higher may be used. Preferably the extraction is carried out at a temperature only slightly below the decomposition temperature of the particular coal being treated, and as the extraction proceeds and the decomposition temperature of the residue rises, the temperature of the extracting solvent may be raised correspondingly. The pressure may be atmospheric or sufficient to maintain the solvent in the liquid phase, but higher pressures are preferably used, for instance pressures up to 10, 20, 50, 100 or 200 atmospheres. Such pressures may for example be produced by means of hydrogen or other gas.

The extraction may be carried to any desired stage. For example it may be carried substantially to completion, in which case 80% or more of the matter contained in the coal may be extracted, or it may be stopped at some earlier stage, for instance when 50 or 60% of the coal has been extracted.

Before subjecting the extracted fraction of the coal to hydrogenation, it is advisable to add thereto a hydrogenation catalyst, for example stannous hydroxide, tin oxalate, molybdic acid or ammonium molybdate, or, especially when the extract contains little sulphur, nickel. Either before or preferably after the addition of the catalyst, the extracting solvent may if desired be partly or wholly removed, for example by distillation or in some other suitable way.

The hydrogenation may be carried out under superatmospheric pressures, for example, pressures of 100 or 200 atmospheres, but it is found possible to cause hydrogen to combine with the extract at considerably lower pressures, e. g. pressures of 50 or 20 atmospheres. The hydrogenation step may, if desired, be repeated in order to produce oils of lower boiling point than those produced in the first stage.

The oils produced by the hydrogenation of the extract are then converted into reactive hydrocarbon gases by thermal decomposition. Preferably the oils are vaporised and subjected to decomposition while in the vapour phase, at temperatures above about 250° or 300° C., for example temperatures of 400–1400° C. or more.

To produce considerable amounts of olefines the vaporised oils may be heated in a turbulent stream to between 700° and 900° C., and especially between 800° and 900° C., while to produce acetylene temperatures above 1000° C., especially 1150° to 1200° C., may be used. If desired the temperature may rise either continuously or in stages as the thermal decomposition proceeds towards completion, and this tends to increase the yield of olefinic or acetylenic gases as opposed to methane and hydrogen. The pressure under which the decomposition is conducted may be, for example, atmospheric or higher than atmospheric, for example 10 to 20 atmospheres, but particularly good results are obtained by employing pressures less than atmospheric, e. g. down to $\frac{1}{10}$ or $\frac{1}{20}$ atmosphere or less. It is advisable to cool the products of the decomposition rapidly as soon as they leave the decomposition zone.

The gases and vapours produced in this stage may be separated, at least to some extent, from one another. For example they may first be cooled so as to condense higher boiling constituents, for example light oils and the like, which may, after being suitably refined, be used as motor fuels or for other purposes. On the other hand, if desired, they may be further treated to produce reactive hydrocarbon gases. Advantageously they may be vaporised and passed in a turbulent stream through a tube at a temperature of, for example, between 600° and 1000° C. or 1400° C. in order to produce olefines or acetylene. If desired the light oils and similar constituents produced in the thermal decomposition may be hydrogenated before use or before being converted into other substances.

From the gases remaining after the removal of the less volatile constituents unsaturated hydrocarbons may, with advantage, be removed. For example the gases may be passed over charcoal in such a way as to absorb olefines on the charcoal, or other agents may be employed, for instance concentrated sulphuric acid. The gas remaining consists largely of methane and may, for instance, be employed in the manufacture of acetylene by thermal decomposition. Hydrogen contained in the gas, and hydrogen obtained as a by-product in the thermal decomposition of the methane, may, if desired, be used for hydrogenation purposes.

Alternatively, a mixture containing olefines and methane which remains after the light oils and similar constituents have been condensed may, without further separation, be subjected to pyrolysis to produce acetylene.

The following example illustrates, but does not in any way limit, the invention.

Example

Bituminous coal of high volatile content is powdered and extracted with a mixture comprising 90 parts by weight of decahydronaphthalene or a mixture of hydrogenated naphthalenes and 10 parts of pyridine, under a pressure of 50–70 atmospheres. The temperature at the beginning of the extraction is 260° C., and this is slowly raised to about 350° C. as the treatment proceeds. When the extraction is substantially complete, the solution is run off from the undissolved residue of the coal, and the pressure is reduced so that the pyridine and the greater part of the hydrogenated naphthalene distils off. The extracted fraction, together with the remainder of the extracting solvent and a molybdenum catalyst which has previously been heated to 500° C. in air, is subjected to a hydrogen pressure of about 100 atmospheres at a temperature of 450°–500° C. The products of the hydrogenation are vaporised under a pressure of 100 mm., and passed rapidly through narrow tubes heated to 850° C., and on issuing from the tubes the gaseous products are rapidly cooled. The olefines formed may be separated by absorption on charcoal.

Having described my invention what I desire to secure by Letters Patent is:

1. Process for the manufacture of unsaturated gases from coal, which comprises heating coal to a temperature between 200° and 400° C. under a pressure higher than 10 atmospheres with an organic solvent composition capable of extracting part of the coal by solution, separating the extract from the residue of the coal, subjecting the extract to hydrogenation under a pressure of at least 20 atmospheres in the presence of a hydrogenation catalyst, vaporizing the product of the hydrogenation, subjecting said product, at a vapor pressure less than atmospheric, to a temperature exceeding 400° C., and rapidly cooling the gases so formed.

2. Process for the manufacture of unsaturated gases from coal, which comprises heating coal to a temperature between 200° and 400° C. under a pressure higher than 10 atmospheres with an organic solvent composition capable of extracting part of the coal by solution, separating the extract from the residue of the coal, removing at least part of the solvent composition by distillation, subjecting the extract remaining to hydrogenation under a pressure of at least 20 atmospheres in the presence of a hydrogenation catalyst, vaporizing the product of the hydrogenation, subjecting said product, at a vapor pressure less than atmospheric, to a temperature exceeding 400° C., and rapidly cooling the gases so formed.

3. Process for the manufacture of gaseous olefines from coal, which comprises heating coal to a temperature between 200° and 400° C. under a pressure higher than 10 atmospheres with an organic solvent composition capable of extracting part of the coal by solution, separating the extract from the residue of the coal, subjecting the extract to hydrogenation under a pressure of at least 20 atmospheres in the presence of a hydrogenation catalyst, vaporizing the product of the hydrogenation, subjecting said product, at a vapor pressure less than atmospheric, to a temperature between 700° and 900° C., and rapidly cooling the gases so formed.

4. Process for the manufacture of acetylene from coal, which comprises heating coal to a temperature between 200° and 400° C. under a pressure higher than 10 atmospheres with an organic solvent composition capable of extracting part of the coal by solution, separating the extract from the residue of the coal, subjecting the extract to hydrogenation under a pressure of at least 20 atmospheres in the presence of a hydrogenation catalyst, vaporizing the product of the hydrogenation, subjecting said product, at a vapor pressure less than atmospheric, to a temperature between 1000° and 1200° C., and rapidly cooling the gases so formed.

5. Process for the manufacture of gaseous olefines from coal, which comprises heating coal to a temperature between 200° and 400° C. under a pressure higher than 10 atmospheres with a hydrogenated naphthalene containing 15 to 35% of a phenol until at least 50% of the coal has gone into solution, separating the solution from the residue of the coal, removing the phenol and at least part of the hydrogenated naphthalene by distillation, subjecting the solution remaining to hydrogenation under a pressure of at least 20 atmospheres at a temperature between 450° and 500° C. in the presence of a hydrogenation catalyst, vaporizing the product of the hydrogenation, subjecting said product, at a vapor pressure less than atmospheric, to a temperature between 700° and 900° C., and rapidly cooling the gases so formed.

6. Process for the manufacture of acetylene from coal, which comprises heating coal to a temperature between 200° and 400° C. under a pressure higher than 10 atmospheres with a hydrogenated naphthalene containing 15 to 35% of a phenol until at least 50% of the coal has gone into solution, separating the solution from the residue of the coal, removing the phenol and at least part of the hydrogenated naphthalene by distillation, subjecting the solution remaining to hydrogenation under a pressure of at least 20 atmospheres at a temperature between 450° and 500° C. in the presence of a hydrogenation catalyst, vaporizing the product of the hydrogenation, subjecting said product, at a vapor pressure less than atmospheric, to a temperature between 1000° and 1200° C., and rapidly cooling the gases so formed.

7. Process for the manufacture of gaseous olefines from coal, which comprises heating coal to a temperature between 200° and 400° C. under a pressure higher than 10 atmospheres with a hydrogenated naphthalene containing 15 to 35% of pyridine until at least 50% of the coal has gone into solution, separating the solution from the residue of the coal, removing the pyridine and part of the hydrogenated naphthalene by distillation, subjecting the solution remaining to hydrogenation under a pressure of at least 20 atmospheres at a temperature between 450° and 500° C. in the presence of a hydrogenation catalyst, subjecting said product, at a vapor pressure less than atmospheric, to a temperature between 700° and 900° C., and rapidly cooling the gases so formed.

HENRY DREYFUS.